Patented Dec. 8, 1931

1,835,713

UNITED STATES PATENT OFFICE

IRVING F. LAUCKS, HARRY P. BANKS, GLENN DAVIDSON, HUGH F. RIPPEY, AND CHARLES N. CONE, OF SEATTLE, WASHINGTON, ASSIGNORS TO I. F. LAUCKS, INC., OF SEATTLE, WASHINGTON, A CORPORATION OF WASHINGTON

PLASTIC COMPOSITION AND METHOD OF MAKING SAME

No Drawing. Application filed October 23, 1925. Serial No. 64,455.

Our invention relates to new plastic compositions for application to walls or other flat or irregular surfaces and method of manufacture of same.

There is a demand for a plastic which can be applied wet, like plaster for example, on walls and similar situations, and which will be slow enough in setting so that it can be worked or "stippled." Such stippling is done to present an irregular surface, rather than the ordinary flat surface of plastered walls.

Such a pastic material must have greater plasticity than common wall plaster. It must also be slower in time of setting and must of course eventually set hard.

We have found that compositions having very valuable properties along the lines above mentioned, can be made from vegetable proteins or vegetable protein containing materials, and in particular, from the protein of the soya bean or from the residue of the soya bean after the oil has been expressed or extracted.

We regard the essential components of such mixtures as being the protein constituent of the vegetable matter, and the "filler" or filling material. The latter may be any one of a number of substances, of the general nature of pigments and fillers used in the paint trade, or similar industries.

The vegetable protein matter, when dispersed, acts as a binding material for the particles of filler, so that when the wet plastic dries, the whole mass has strength. In this respect the colloidal protein or vegetable matter acts much like cement in concrete.

The filler not only makes bulk but also gives color, covering properties, opacity, and influences the texture of the final mass. It may also be partially dispersed by the colloidal vegetable matter.

A suitable drying oil such as boiled linseed oil, heat treated china wood oil or perilla oil or soya bean oil or their equivalents, or mixtures of two or more, may be added for the purpose of increasing the elasticity and to reduce the alkalinity of the finished product when alkalies are used as dispersing agents. The oil may be added after the dry ingredients are mixed with water or solution of alkali as may be found preferable in the formula chosen, or the oil may be added to the dry mixture.

As filling materials, we have used plaster of Paris (calcined gypsum), talc, china clay or kaolin, diatomaceous earth or silica, calcium carbonate, (chalk), barytes, lithopone, ochres, asbestos, white lead, various colored pigments, and the like.

If desired, coarser materials, such as ground rock, sand, etc. etc. may be incorporated.

The nature of the final surface will vary depending on the nature of the filler used, and combinations of individual fillers are used to give the desired results.

The vegetable protein matter is ordinarily dispersed or brought into soluble or colloidal condition, by the use of alkalies, although any agent which will produce the effect on the vegetable matter of bringing it into colloidal condition may be used. We do not restrict ourselves to the use of alkalies, but inasmuch as they are cheap and easily obtained, we use them in practice.

The vegetable material may either be dispersed or brought into colloidal state, by the use of caustic soda, adding it as such, or by adding alkaline salts and lime, which by inter-action in presence of water, form caustic soda. The latter method is convenient when it is desired to mix the whole of the dry materials with water as used.

When the vegetable material, for example soya bean flour, is first dispersed and the filler afterwards added to the wet colloidal mass, caustic soda may be used as such.

Either method may be used, depending on circumstances. Perhaps in most cases the more convenient way is to premix the ingredients in the powdered state, then add water and mix wet at the time they are to be used.

In the latter method for example, a filler, such as china clay or talc, soya bean flour, sodium carbonate and hydrated lime are dry mixed.

A very satisfactory formula is as follows: 200 parts soya bean flour; 30 parts hydrated lime; 40 parts sodium carbonate; 540 parts kaolin are dry mixed. To three (3) parts of such mixture are added four (4) parts of water and the wet mixture stirred for a short time to develop maximum plasticity. Twenty or more parts of boiled linseed oil or its equivalent may be added at this point.

The amount of water may be varied at will to produce a thicker or thinner mass. When thick, the wet mass may be applied as plaster. At thinner consistencies it may be used as a paint or calcimine. It has good covering properties and is very desirable for many kinds of coatings.

When dry, it is resistant to the action of water. It will not disintegrate or lose its adhesion when immersed in water, and when the water is dried out, it regains its previous condition. It adheres well to wood, metals, brick, concrete, plaster, etc. It is tougher and not as brittle as plaster or similar materials, and has much less tendency to crack under small distortion. Because of its adhesion to various materials, it can be used in many places where plaster would not be suitable.

Compositions of this nature may also be used in further dilution as retarders for ordinary plaster to delay their time of setting. They may be used for wood putty, filling for joints, etc.

We do not wish to restrict ourselves to the specific ingredients named. Other substances may be used in the place of those mentioned to secure the same results, and such we claim as equivalents.

We claim:

1. A wall-finish composition of matter which includes a body of filler material, lithopone, a soya bean binder, and a drying oil.

2. A wall-finish composition whose plastic qualities are developed by water-mixing, said composition comprising a predominant proportion of inorganic filler, a drying oil, and a binder of proteinous seed flour in amount adequate to hold the filler, and the total actual protein being in proportion of less than 1 part by weight to 3 parts by weight of the inorganic filler.

3. A wall-finish composition whose plastic qualities are developed by water-mixing, said composition comprising a predominant proportion of inorganic filler, a drying oil, and a binder of soya bean flour in amount adequate to hold the filler, and the total actual protein being in proportion of less than 1 part by weight to 3 parts by weight of the inorganic filler.

4. A wall-finish composition whose plastic qualities are developed by water-mixing, said composition comprising a predominant proportion of inorganic filler, lithopone, a drying oil, and a binder of proteinous seed flour in amount adequate to hold the filler, and the total actual protein being in proportion of less than 1 part by weight to 3 parts by weight of the inorganic filler.

5. A method of making a wall-finish composition, which comprises dry mixing a predominant proportion of inorganic filler, and a binder of proteinous seed flour in amount adequate to hold the filler, and the total actual protein being in proportion of less than 1 part by weight to 3 parts by weight of the inorganic filler, and adding a drying oil.

6. A method of making a wall-finish composition, which comprises mixing a predominant proportion of inorganic filler, and a binder of soya bean flour in amount adequate to hold the filler, and the total actual protein being in proportion of less than 1 part by weight to 3 parts by weight of the inorganic filler, and adding a drying oil.

In witness whereof, we hereunto subscribe our names this 17th day of October, 1925.

IRVING F. LAUCKS.
HARRY P. BANKS.
GLENN DAVIDSON.
HUGH F. RIPPEY.
CHARLES N. CONE.